INVENTORS
WILLIS G. WING
JOHN R. MOTT
BY
ATTORNEY

United States Patent Office 2,978,638
Patented Apr. 4, 1961

2,978,638

COERCION-FREE CAPACITANCE BRIDGE PICK-OFF

Willis G. Wing and John R. Mott, Glen Head, N.Y., assignors to Sperry Rand Corporation, Great Neck, N.Y., a corporation of Delaware Filed Jan. 26, 1959, Ser. No. 788,917

4 Claims. (Cl. 324—70)

The present invention generally relates to electrical devices producing a signal representative of minute displacements of a movable member and, more particularly, to a capacitance bridge pick-off device wherein the movable conductive plate member is substantially free from electrostatic coercive forces.

Capacitance pick-off devices are well known in the art for the production of an output signal representative of the displacement of a conductive plate member. A common form of such devices includes first and second conductive plates whose adjacent edges are separated from each other by an electrical insulating material. A third conductive plate is placed in a parallel relationship with the first and second plates, the surface of the third plate being separated from the surfaces of the other plates by a dielectric material. The resulting structure effectively comprises first and second capacitors whose plates consist of the first and third plates and the second and third plates, respectively. The third plate, for example, may be translated along a line parallel to the first and second plates whereby the capacitances of the first and second capacitors are oppositely varied in accordance with the displacement of the third plate. A push-pull excitation voltage is applied between the first and second plates and the output signal is derived from the third plate. The output signal is a measure of the relative capacitance of the first and second capacitors which, in turn, is proportional to the displacement of the third plate. The phase of the output signal is indicative of the sense of the displacement.

It has been observed that a coercive force is imposed on the movable plate member of the capacitance pick-off which varies as a function of the displacement of the member from its neutral position at which the capacitances of the first and second capacitors are equal. The greater the displacement from the neutral position, the greater the coercive force. Consequently, in applications where the output signal is interpreted as a function of the displacing force rather than as merely a measure of the resultant displacement, the output signal is subject to error attributable to the coercive force. One common example of such an application is the singly-integrating accelerometer disclosed in Patent 2,840,366, issued on July 24, 1958, to Willis G. Wing and assigned to the present assignee.

It is the general object of the present invention to provide a capacitance bridge pick-off device wherein the electrostatic coercive force acting on the movable conductive plate may be reduced to an arbitrary minimum.

It is an other object of the present invention to provide means for reducing toward zero the electrical potential of the movable conductive plate component of a capacitance pick-off.

A further object is to provide signal feedback means in an accelerometer utilizing a capacitance bridge pick-off to substantially eliminate electrostatic coercive forces acting on the movable conductive plate member of the pick-off.

These and other objects of the present invention, as will more fully appear from a reading of the following specification, are accomplished in a representative accelerometer embodiment of the present invention by the provision of first and second capacitors comprising cylintrically shaped and coaxially mounted conductive plates. Each of the capacitors shares a common cylindrical plate which is adapted for displacement along the axis of the concentric plate cylinders. Each of the other cylindrical plates of the first and second capacitors is of the same predetermined radius. Axial displacement of the movable common cylindrical plate oppositely varies the capacities of the first and second capacitors.

An additional cylindrical electrode concentric with and of the same radius as that of said other cylindrical plates of the first and second capacitors is placed longitudinally between said other plates along the common axis. Means are provided for coupling the signal appearing on the movable cylinder to the input of a phase-inverting amplifier. The output signal of the amplifier is applied to the additional cylindrical electrode. The signal feedback circuit including the phase-inverting amplifier and the additional cylindrical electrode reduces the potential of the movable cylinder to an arbitrary minimum. Inasmuch as the electrostatic coercive force acting on the movable cylinder varies directly with the potential of the movable cylinder, the feedback arrangement substantially eliminates said coercive force.

For a more complete understanding of the present invention, reference should be had to the following description and to the appended drawings of which:

Figure 1:
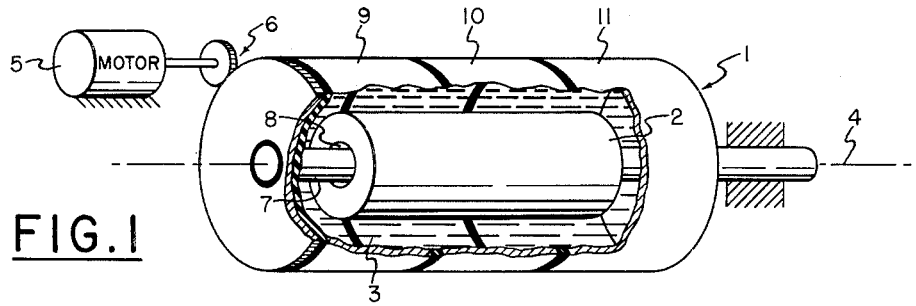
Fig. 1 is a simplified cut-away view of the rotating cylindrical chamber component of a singly-integrating accelerometer wherein the capacitance bridge pick-off device of the present invention may be advantageously employed.

A brief qualitative description of a conventional singly-integrating accelerometer such as disclosed in Patent 2,840,366 will be given with the aid of Fig. 1. Reduced to its essential elements, the accelerometer comprises the cylindrical chamber 1 of Fig. 1 which contains a bobbin or float 2 of annular cross section immersed in a viscous fluid 3 which completely fills the remaining volume of chamber 1. The entire chamber assembly is spun about its suitably supported longitudinal axis 4 by motor 5 and gear arrangement 6. Float 2 is designed to have a lesser average density than that of fluid 3 which fills chamber 1. Consequently, as chamber 1 is spun about its longitudinal axis, the greater centrifugal force acting on denser fluid 3 causes fluid 3 to uniformly occupy the space between the outer surface of float 2 and the inner surface of chamber 1. Thus, float 2 is urged into axial alignment with chamber 1. If an acceleration force is applied along the axis 4 of chamber 1, float 2 will move along axis 4 in the same sense as that of the applied accelerating force.

A central cylinder or shaft 7, attached to cylindrical chamber 1, passes through the enlarged bore 8 of float 2. In accordance with the present invention, the outer shell of chamber 1 is divided electrically into three portions 9, 10 and 11 along axis 4. An alternating excitation voltage is applied in push-pull to portions 9 and 11 in a conventional manner. The voltage appearing on shaft 7 then is lineally proportional to the longitudinal position of float 2 along axis 4.

Figure 2:
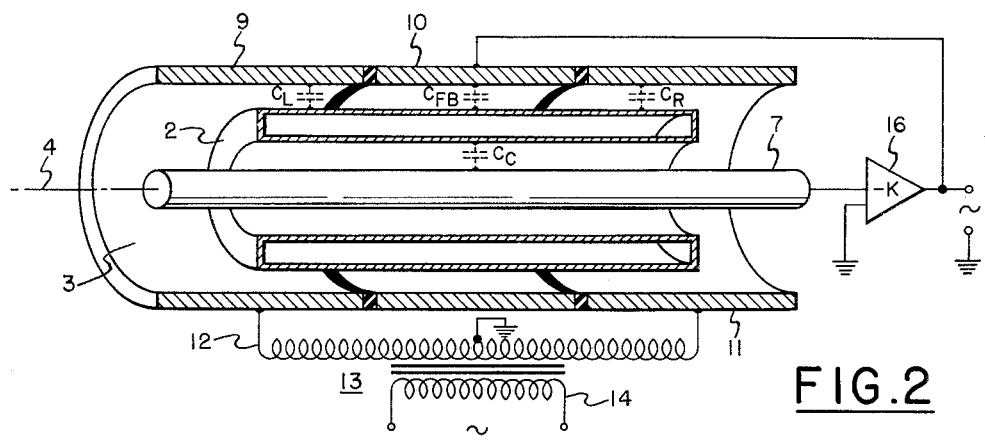
Fig. 2 is a simplified sectional view of the cylindrical chamber of Fig. 1 constructed in accordance with the present invention.

The capacitance bridge pick-off device included within chamber 1 of Fig. 1 is more clearly shown in the simplified sectional view of Fig. 2. Float 2 is made hollow in the view of Fig. 2 to reduce its weight-to-volume ratio thereby enhancing its buoyancy in the surrounding fluid 3. Fluid 3 is the dielectric material of the capacitors formed by portions 9, 10 and 11, float 2 and shaft 7. Capacitor $C_L$ represents the effective capacitance of the capacitor formed by portion 9 and float 2; capacitor $C_R$ represents the effective capacitance between portion 11 and float 2; capacitor $C_C$ represents the fixed capacitive coupling acting between float 2 and shaft 7. Portions 9 and 11 are excited by the oppositely-phased signals appearing across the secondary 12 of transformer 13. The center tap of secondary 12 is grounded. A source of excitation voltage is connected across the terminals of primary 14 of transformer 13.

Figure 3:
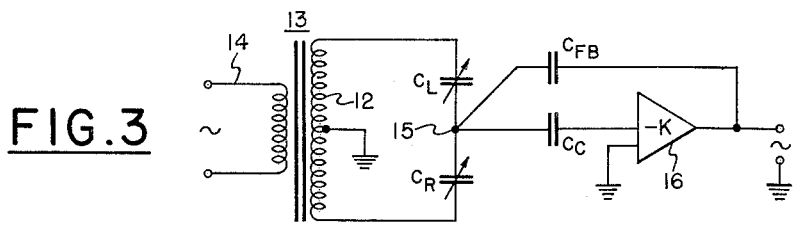
Fig. 3 is a schematic representation of the equivalent circuit of Fig. 2.

The equivalent circuit of the capacitance bridge pick-off of Fig. 2 is shown in the schematic diagram of Fig. 3. Capacitors $C_L$ and $C_R$ are indicated as being variable in Fig. 3 as determined by the longitudinal position of float 2 along axis 4 of Fig. 2. By inspection of Fig. 3, it will be seen that the potential of point 15 with respect to ground is a measure of the difference in capacity between capacitors $C_L$ and $C_R$. When float 2 is in its neutral longitudinal position along axis 4 as shown in Figs. 1 and 2, equal surface areas of float 2 will be presented to portions 9 and 11 whereby the capacities of capacitors $C_L$ and $C_R$ will be made equal. In such an event an equal amount of oppositely-phased signal voltage will be applied to point 15 of Fig. 3 by capacitors $C_L$ and $C_R$ so that the potential of point 15 will be zero with respect to ground. The potential of point 15, corresponding to the potential of float 2 of Figs. 1 and 2, is applied by means of capacitor $C_C$ to the input of phase-inverting amplifier 16. The signal at the output of amplifier 16 is applied by feedback capacitor $C_{FB}$ to point 15.

In terms of Fig. 2, the potential of float 2 is coupled via capacitor $C_C$ to shaft 7 which, in turn, is directly connected to the input of amplifier 16. The output signal of amplifier 16 is applied to central cylindrical portion 10. Portion 10 in combination with fluid 3 and float 2 comprises feedback capacitor $C_{FB}$. The potential of float 2 is applied to the input of amplifier 16 whose amplified and phase-inverted output signal is coupled back to float 2 via capacitor $C_{FB}$.

As is well understood in the negative feedback amplifier art, the potential at the input to such an amplifier may be reduced to an arbitrary minimum value by appropriate increase in the gain of the amplifier. In this way the potential of float 2 with respect to ground can be reduced to any preassigned value and can be made negligible. Of course, the signal appearing at the output of amplifier 16 still usefully represents the longitudinal displacement of float 2 from its neutral position.

The manner in which the feedback arrangement including amplifier 16 and additional cylindrical plate portion 10 reduces the electrostatic coercive force acting on float 2 may be demonstrated as follows. The electrostatic force ($F_C$) which coerces float 2 back to its neutral position may be expressed as:

$$F_c = \frac{\delta W}{\delta x}$$

where W represents the sum of the energies stored in capacitors $C_L$ and $C_R$ and $x$ represents the longitudinal displacement of float 2 along axis 4.

In terms of Fig. 2:

$$W = \frac{1}{2}C_L\left(\frac{E_2 - E_{12}}{\sqrt{2}}\right)^2 + \frac{1}{2}C_R\left(\frac{E_2 + E_{12}}{\sqrt{2}}\right)^2$$

where $E_2$ is the peak potential of float 2 with respect to ground and $E_{12}$ is the peak magnitude of the potential of portions 9 and 11 with respect to ground.

Thus, (1)
$$F_c = \frac{\delta W}{\delta x} = \frac{C_L}{2}\left[2\left(\frac{E_2 - E_{12}}{\sqrt{2}}\right)\left(\frac{\delta E_2}{\sqrt{2}\delta x}\right)\right] + \frac{1}{2}\left(\frac{E_2 - E_{12}}{\sqrt{2}}\right)^2\frac{\delta C_L}{\delta x} + \frac{C_R}{2}\left[2\left(\frac{E_2 + E_{12}}{\sqrt{2}}\right)\left(\frac{\delta E_2}{\sqrt{2}\delta x}\right)\right] + \frac{1}{2}\left(\frac{E_2 + E_{12}}{\sqrt{2}}\right)^2\frac{\delta C_R}{\delta x}$$

By virtue of the negative feedback circuit including amplifier 16 and additional cylindrical portion 10, the potential $E_2$ on float 2 is reduced substantially to zero as previously explained. Accordingly, the terms $E_2$ and $\delta E_2$ may be considered as being equal to zero. Expression 1 then reduces to the following:

(2)
$$F_c = \frac{1}{2}\left(\frac{-E_{12}}{\sqrt{2}}\right)^2\frac{\delta C_L}{\delta x} + \frac{1}{2}\left(\frac{E_{12}}{\sqrt{2}}\right)^2\frac{\delta C_R}{\delta x}$$

It will be recalled that the longitudinal motion of float 2 along axis 4 is such as to oppositely vary the capacities of capacitors $C_L$ and $C_R$. Thus, (3)
$$\frac{\delta C_L}{\delta x} = -\frac{\delta C_R}{\delta x}$$

Substituting Expression 3 into Expression 2 there results $F_C = 0$. In this way, the negative feedback circuit including amplifier 16 and additional cylindrical portion 10 substantially eliminates the electrostatic coercive force on movable cylindrical plate 2.

Figure 4:
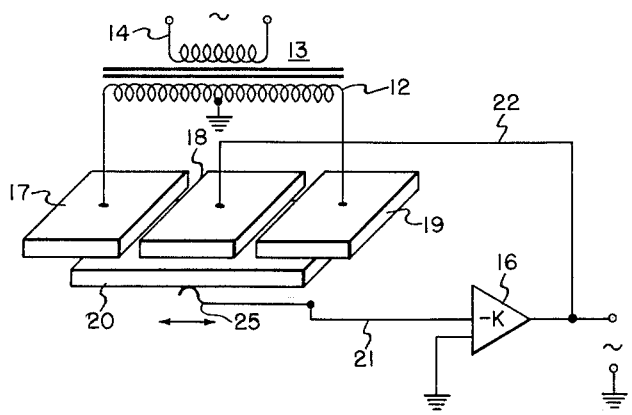
Fig. 4 is a variation of the capacitance bridge pick-off device of Fig. 2 suitable for use apart from an accelerometer.

It should be noted that coupling capacitor $C_C$ of Figs. 2 and 3 is not required by the present invention but rather is a standard component of prior art accelerometers. The simplified arrangement of Fig. 4 is illustrative of the present invention as applied to a standard capacitance bridge pick-off device used independently of an accelerometer. It will be noted from Fig. 4 that not only may the coupling capacitor $C_C$ of Fig. 2 be eliminated but also the shapes of the capacitor plates 9, 10, 11 and 2 need not be cylindrical but may be, for example, planar. In the arrangement of Fig. 4, plates 17, 18, 19 and 20 correspond, respectively, to cylindrical plates 9, 10, 11 and 2. The potential of translatable plate 20 is applied via a flexible wire or spring contact 25 and lead 21 to the input of phase-inverting amplifier 16. The amplified and phase-inverted output signal of amplifier 16 is directly coupled by lead 22 to plate 18. In a manner similar to that previously described in connection with the apparatus of Fig. 2, the negative feedback circuit of Fig. 4 is operative to reduce the signal appearing on plate 20 and the electrostatic coercive force acting thereon substantially to zero.

From the preceding specification it can be seen that the objects of the present invention have been accomplished by the provision in a capacitance bridge pick-off device of an additional capacitance plate which functions as a feedback electrode. The potential on the movable plate member of the pick-off is applied to a phase-inverting amplifier whose output signal, in turn, is applied to the additional capacitance plate. The feedback arrangement is operative to substantially reduce the coercive force acting on the movable plate member in direct proportion to the magnitude of the gain of the amplifier. The coercive force acting on the movable element varies inversely to the gain of the amplifier and can be made arbitrarily small.

While the invention has been described in its preferred embodiments, it is understood that the words which have been used are words of description rather than of limitation and that changes within the purview of the appended claims may be made without departing from the true scope and spirit of the invention in its broader aspects.

What is claimed is:

1. A capacitance pick-off device comprising first, second, third and fourth conductive plates, electrical insulating means for separating and supporting said first, second and third plates, means for positioning said fourth plate relative to said first, second and third plates and providing for the motion of said fourth plate along a line parallel to said first, second and third plates, said fourth plate being separated from said first, second and third plates by a fluid dielectric material, means for energizing said first and third plates with a push-pull alternating electrical signal, alternating signal phase-inverting means, means for coupling said fourth plate to the input of said phase-inverting means and means for coupling the output of said phase-inverting means to said second plate.

2. A capacitance pick-off comprising first, second and third parallel plate capacitors; said capacitors comprising first, second and third coplanar conductive plates whose edges are separated from each other by an electrical insulating material and a fourth conductive plate having a surface parallel to the surfaces of said first, second and third plates and separated therefrom by a dielectric material, said fourth plate being fully coextensive with said second plate and being partially coextensive with said first and third plates, said fourth plate being translatable relative to said first, second and third plates along a line parallel to the common plane of said first, second and third plates; means for exciting said first and third plates with a push-pull alternating potential, alternating signal phase-inverting means, means for coupling said fourth plate to the input of said phase-inverting means, and means for coupling the output of said phase-inverting means to said second plate.

3. An integrating accelerometer comprising an outer cylinder, said outer cylinder consisting of first, second and third conductive cylindrical portions separated from each other along the axis of said outer cylinder by an electrical insulating material, an inner cylinder coaxially mounted within said outer cylinder and adapted to be rotated therewith, an annular float of less length than said cylinders and mounted between said outer and inner cylinders, said float being separated from said outer and inner cylinder by a dielectric fluid material, means for exciting said first and third cylindrical portions of said outer cylinder with a push-pull alternating electrical signal, phase-inverting amplifying means, means for coupling said inner cylinder to the input of said amplifying means, and means for coupling the output of said amplifying means to said second cylindrical portion of said outer cylinder.

4. In a singly-integrating accelerometer, a coercion free capacitance pick-off device, said pick-off device comprising first, second, third and fourth parallel plate capacitors, said plates consisting of first, second, third, fourth and fifth cylindrically shaped and coaxially mounted conductive members, said first, second and third members being of equal radii, said fifth member having the smallest radius, said fourth member having a radius intermediate the radius of said fifth member and the radius of said first, second and third members, said first, second and third members being supported longitudinally along the common axis by an electrical insulating material and completely enclosing a volume containing said fourth and fifth members, said volume being filled with dielectrical fluid material, means for rotating said first, second and third members about said common axis, means for energizing said first and third members by a push-pull alternating electrical signal, phase-inverting amplifying means, means for coupling said fifth member to the input of said amplifying means, and means for coupling the output of said amplifying means to said second member.

References Cited in the file of this patent

UNITED STATES PATENTS

| | | |
|---|---|---|
| 2,591,921 | Cosgriff | Apr. 8, 1952 |
| 2,840,366 | Wing | June 24, 1958 |